United States Patent
Yun

(10) Patent No.: US 7,149,028 B2
(45) Date of Patent: *Dec. 12, 2006

(54) TRANSMISSIVE-DIFFRACTIVE LIGHT MODULATOR

(75) Inventor: Sang Kyeong Yun, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 42 days.

This patent is subject to a terminal disclaimer.

(21) Appl. No.: 10/951,543

(22) Filed: Sep. 28, 2004

(65) Prior Publication Data

US 2005/0243401 A1   Nov. 3, 2005

(30) Foreign Application Priority Data

Apr. 29, 2004   (KR) .................. 10-2004-0029928

(51) Int. Cl.
*G02B 26/00* (2006.01)

(52) U.S. Cl. .............. 359/290; 359/291; 359/292; 359/224; 359/298; 359/303; 359/318

(58) Field of Classification Search ............... 359/223, 359/224, 290–292, 295, 298, 303, 318
See application file for complete search history.

(56) References Cited

U.S. PATENT DOCUMENTS 5,311,360 A      5/1994   Bloom et al.
2005/0270622 A1*  12/2005  Hong et al. ............ 359/290

FOREIGN PATENT DOCUMENTS

KR     2003-77389     11/2003

\* cited by examiner

*Primary Examiner*—Evelyn A. Lester
(74) *Attorney, Agent, or Firm*—Christensen O'Connor Johnson Kindness PLLC

(57) ABSTRACT

The present invention provides a transmissive-diffractive light modulator in which a substrate having the same structure as that of a conventional diffractive light modulator has a light transmittance gate or is made of a transparent material, thus diffracting incident light while the incident light passes through the substrate.

10 Claims, 15 Drawing Sheets

TRANSMISSIVE-DIFFRACTIVE LIGHT MODULATOR

BACKGROUND OF THE INVENTION

1. Field of the Invention

The present invention relates generally to diffractive light modulators, and more particularly, to a transmissive-diffractive light modulator in which a substrate having the same structure as that of a conventional diffractive light modulator has a light transmittance gate or is made of a transparent material, thus diffracting incident light while the incident light passes through the substrate.

2. Description of the Related Art

Generally, an optical signal processing technology has advantages in that a great amount of data is quickly processed in a parallel manner unlike a conventional digital information processing technology in which it is impossible to process a great amount of data in real time, and studies have been conducted on the design and production of a binary phase only filter, an optical logic gate, a light amplifier, an image processing technique, an optical device, and a light modulator using a spatial light modulation theory.

Of them, the spatial light modulator is applied to optical memory, optical display device, printer, optical interconnection, and hologram fields, and studies have been conducted to develop a display device employing it.

The spatial light modulator is embodied by a reflective deformable grating light modulator 10 as shown in FIG. 1. The light modulator 10 is disclosed in U.S. Pat. No. 5,311,360 by Bloom et al. The light modulator 10 includes a plurality of reflective deformable ribbons 18, which have reflective surface parts, are suspended on an upper part of a silicon substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited.

The nitride film 14 is patterned by the ribbons 18, and a portion of the silicon dioxide film 12 is etched, thereby maintaining the ribbons 18 on the oxide spacer layer 12 by a nitride frame 20.

In order to modulate light having a single wavelength of $\lambda_o$, the modulator is designed so that thicknesses of the ribbon 18 and oxide spacer 12 are each $\lambda_o/4$.

Limited by a vertical distance (d) between a reflective surface 22 of each ribbon 18 and a reflective surface of the substrate 16, a grating amplitude of the modulator 10 is controlled by applying a voltage between the ribbon 18 (the reflective surface 22 of the ribbon 18 acting as a first electrode) and the substrate 16 (a conductive layer 24 formed on a lower side of the substrate 16 to act as a second electrode).

In an undeformed state of the light modulator with no voltage application, the grating amplitude is $\lambda_o/2$ while a total round-trip path difference between light beams reflected from the ribbon and substrate is $\lambda_o$. Thus, a phase of reflected light is reinforced.

Accordingly, in the undeformed state, the modulator 10 acts as a plane mirror when it reflects incident light. In FIG. 2, the reference numeral 20 denotes the incident light reflected by the modulator 10 in the undeformed state.

When a proper voltage is applied between the ribbon 18 and substrate 16, the electrostatic force enables the ribbon 18 to move downward toward the surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference.

The modulator diffracts incident light 26 using the interference. In FIG. 3, the reference numerals 28 and 30 denote light beams diffracted in +/- diffractive modes ($D_{+1}$, $D_{-1}$) in the deformed state, respectively.

However, the Bloom's light modulator adopts an electrostatic method to control a position of the micromirror, which has disadvantages in that an operating voltage is relatively high (usually, 20 V or so) and a correlation between the applied voltage and displacement is not linear, resulting in poor reliability in the course of controlling light.

To avoid the above disadvantages, there is suggested "a thin-film piezoelectric light modulator and a method of producing the same" as disclosed in Korean Pat. Application No. P2003-077389.

FIG. 4 is a cross-sectional view of a recess-type thin-film piezoelectric light modulator according to a conventional technology.

Referring to FIG. 4, the recess-type thin-film piezoelectric light modulator according to the conventional technology includes a silicon substrate 401 and elements 410.

In this regard, the elements 410, which have predetermined widths and are arranged at regular intervals, constitute the recess-type thin-film piezoelectric light modulator. Alternatively, the elements 410 having different widths may alternate to constitute the recess-type thin-film piezoelectric light modulator. As a further alternative, the elements 410 may be spaced apart from each other at regular intervals (each interval is almost the same as the width of each element 410), in which a micromirror layer formed on an upper side of the silicon substrate 401 reflects incident light to diffract it.

The silicon substrate 401 has a recess to provide an air space to each element 410, an insulating layer 402 is deposited on an upper surface of the substrate, and ends of the elements 410 are attached to upper sides of a wall of the recess.

The elements 410 each have a rod shape, and lower sides of ends of the elements are attached to the remaining upper side of the substrate 401 except for the recess so that the centers of the elements are spaced from the recess of the silicon substrate 401. Additionally, each element 410 includes a lower supporter 411 which has a vertically movable portion corresponding in position to the recess of the silicon substrate 401.

Furthermore, the element 410 is laminated on a left end of the lower supporter 411, and includes a lower electrode layer 412 for providing a piezoelectric voltage, a piezoelectric material layer 413 which is laminated on the lower electrode layer 412 and shrunken and expanded when a voltage is applied to both sides thereof to generate vertical actuating forces, and an upper electrode layer 414 which is laminated on the piezoelectric material layer 413 and provides a piezoelectric voltage to the piezoelectric material layer 413.

Furthermore, the element 410 is laminated on a right end of the lower supporter 411, and includes a lower electrode layer 412' for providing a piezoelectric voltage, a piezoelectric material layer 413' which is laminated on the lower electrode layer 412' and shrunken and expanded when a voltage is applied to both sides thereof to generate vertical actuating forces, and an upper electrode layer 414' which is laminated on the piezoelectric material layer 413' and provides a piezoelectric voltage to the piezoelectric material layer 413'.

Additionally, Korean Pat. Application No. P2003-077389 describes an extrusion type as well as the recess type.

In the meantime, transmissive-spatial light modulators as well as conventional reflective spatial light modulators are representative examples of devices to spatially turn light ON/OFF. FIG. 4 is a view showing operation of a conventional transmissive-spatial light modulator.

As shown in FIG. 4, when natural light 501 enters into the conventional transmissive-spatial light modulator, the natural light 501 is polarized to form polarized light 503 having a directional character while passing through an incident-side polarizing plate 502.

The polarized light 503, which passed through the incident-side polarizing plate 502, rotates at an angle of 90° while passing through a liquid crystal part 504 of an OFF state. Thereafter, the polarized light 503 reaches an exit-side polarizing plate 506. At this time, the polarized light 503, which has been rotated at an angle of 90°, can pass through the exit-side polarizing plate 506, because the exit-side polarizing plate 506 crosses the incident-side polarizing plate 502.

However, in a liquid crystal part 505 of an ON state, light passing through the incident-side polarizing plate 502 directly reaches the exit-side polarizing plate 506 without being rotated at the angle of 90°. At this time, because the polarizing direction of the light reaching the exit-side polarizing plate 506 is perpendicular to the exit-side polarizing plate 506, the light cannot pass through the exit-side polarizing plate 506.

The above-mentioned principle is used in an LCD (liquid crystal display) in which transmissibility of light is controlled by applying voltage to a liquid crystal. In the LCD, a liquid crystal part 504, 505 is provided between an incident-side polarizing plate 502 and an exit-side polarizing plate 502.

Polarizing directions of the incident-side polarizing plate 502 and the exit-side polarizing plate 502 cross each other. The liquid crystal part 504, 505 changes the polarizing direction of light using applied voltage.

In light modulators having structures similar to the above-mentioned LCD, there are a light modulator which is turned ON/OFF by a signal formed on a Braun tube, and a reflective LCD in which a reflective film is formed on a surface of a liquid crystal part. These light modulators are also operated by the above-mentioned principle of polarizing incident light.

SUMMARY OF THE INVENTION

Accordingly, the present invention has been made keeping in mind the above problems occurring in the prior art, and an object of the present invention is to provide a transmissive-diffractive light modulator which is manufactured by forming a light transmittance gate on a substrate of a conventional diffractive light modulator, thus diffracting incident light while the incident light passes through the light transmittance gate.

In an aspect, the present invention provides a transmissive-diffractive light modulator, including: a substrate made of a transparent material; a plurality of upper reflective plates being arranged on the substrate to be spaced apart from each other at predetermined intervals and each having a ribbon shape, each of the upper reflective plates being attached at both ends thereof to the substrate while spaced at an intermediate portion thereof from the substrate and being vertically movable at the intermediate portion thereof, with a reflective lower surface provided on each of the upper reflective plates to reflect or diffract incident light; a plurality of lower reflective plates attached to predetermined positions of the substrate at which the plurality of upper reflective plates are spaced from the substrate, so as to reflect or diffract the incident light, the plurality of lower reflective plates being spaced apart from each other at predetermined intervals; and an actuating unit to move the plurality of upper reflective plates vertically.

In another aspect, the present invention provides a transmissive-diffractive light modulator, including: a substrate having a light transmittance gate therein; a plurality of upper reflective plates being arranged on the substrate to be spaced apart from each other at predetermined intervals and each having a ribbon shape, each of the upper reflective plates being attached at both ends thereof to the substrate while passing over the light transmittance gate and being vertically movable at the intermediate portion thereof, with a reflective lower surface provided on each of the upper reflective plates to reflect or diffract incident light; a plurality of lower reflective plates attached at both ends thereof to sidewalls of the light transmittance gate of the substrate while being spaced apart from the plurality of upper reflective plates by predetermined distances, the plurality of lower reflective plates being arranged in the same direction as an arrangement direction of the upper reflective plates, thus reflecting or diffracting incident light; and an actuating unit to vertically move the plurality of upper reflective plates.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
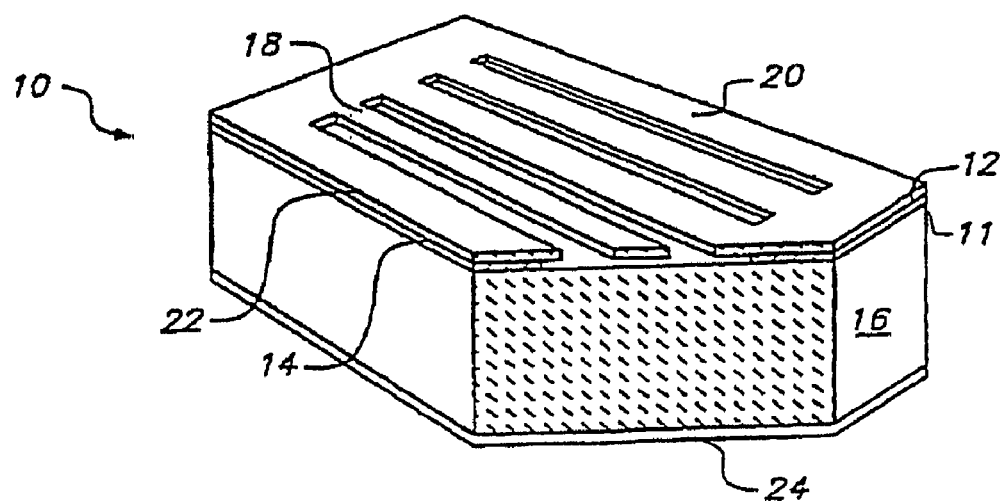
FIG. 1 illustrates a grating light modulator adopting an electrostatic manner according to a conventional technology.
Figure 2:
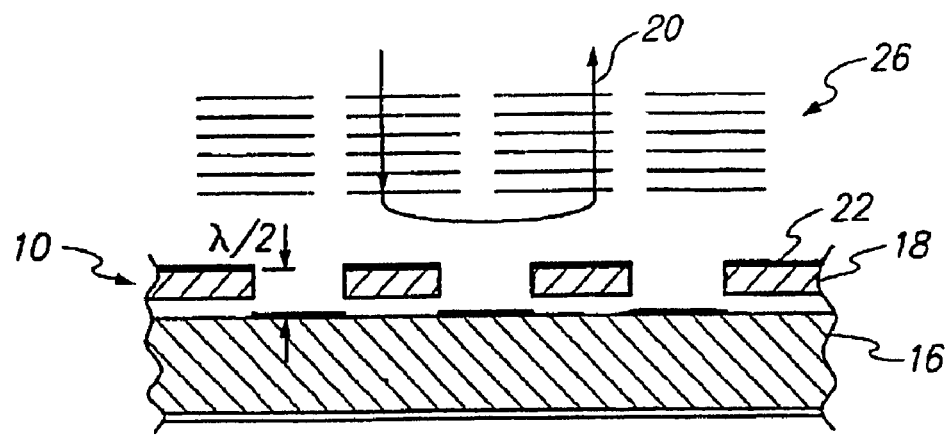
FIG. 2 illustrates reflection of incident light by the grating light modulator adopting the electrostatic manner according to the conventional technology in an undeformed state.
Figure 3:
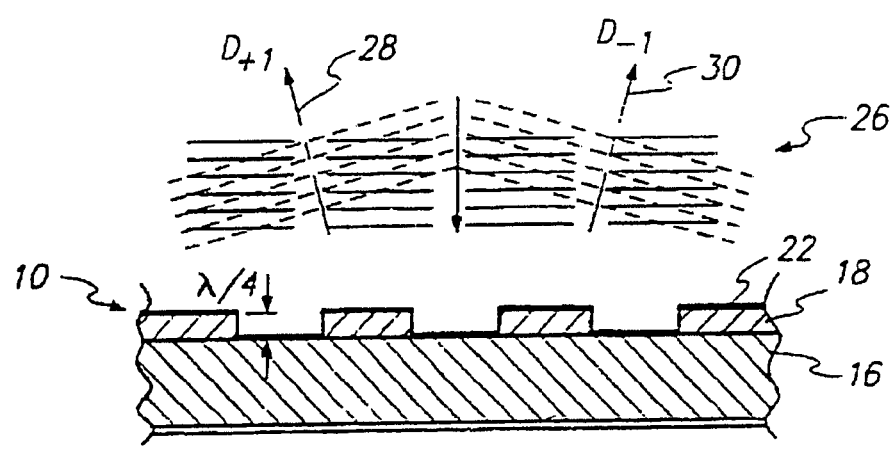
FIG. 3 illustrates diffraction of incident light by the grating light modulator according to the conventional technology in a deformed state caused by an electrostatic force.
Figure 4:
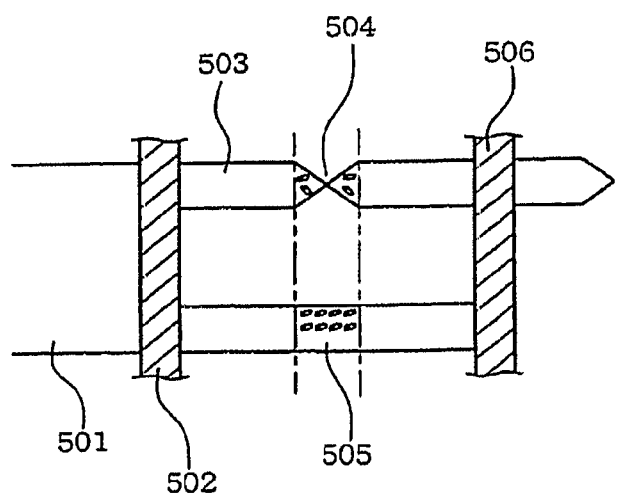
FIG. 4 is a view showing operation of a conventional transmissive liquid crystal light modulator.

Hereinafter, embodiments of the present invention will be described in detail with reference to the attached drawings.

Reference now should be made to the drawings, in which the same reference numerals are used throughout the different drawings to designate the same or similar components.

Figure 5A:
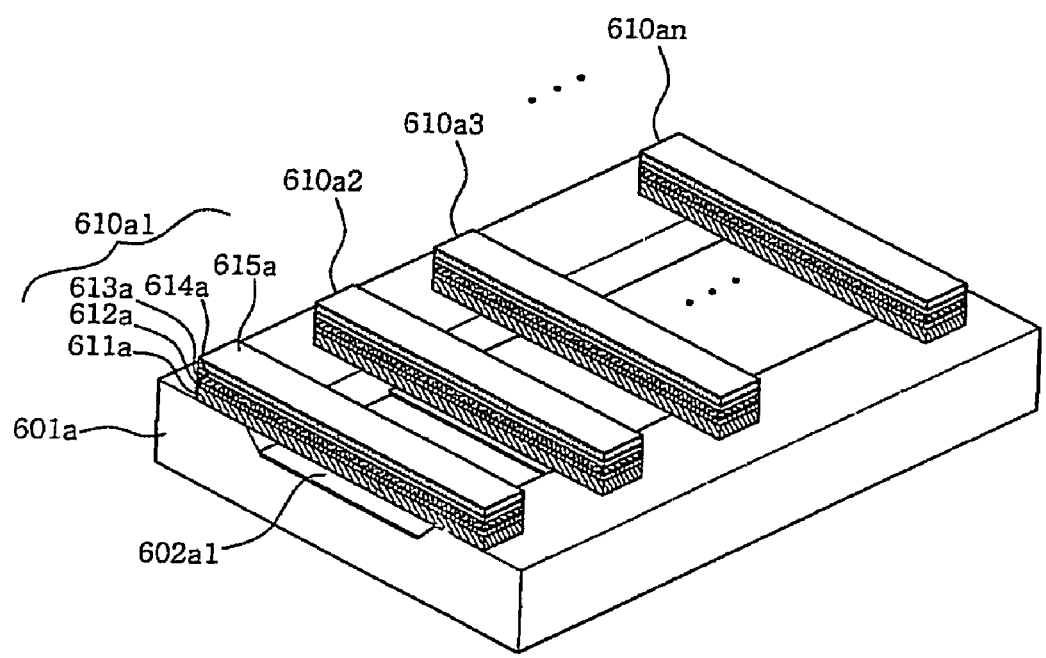
FIGS. 5a through 5l are perspective views of transmissive-diffractive light modulators or are exploded perspective views of substrates of the transmissive-diffractive light modulators, according to first through sixth embodiments of the present invention.
Figure 5B:
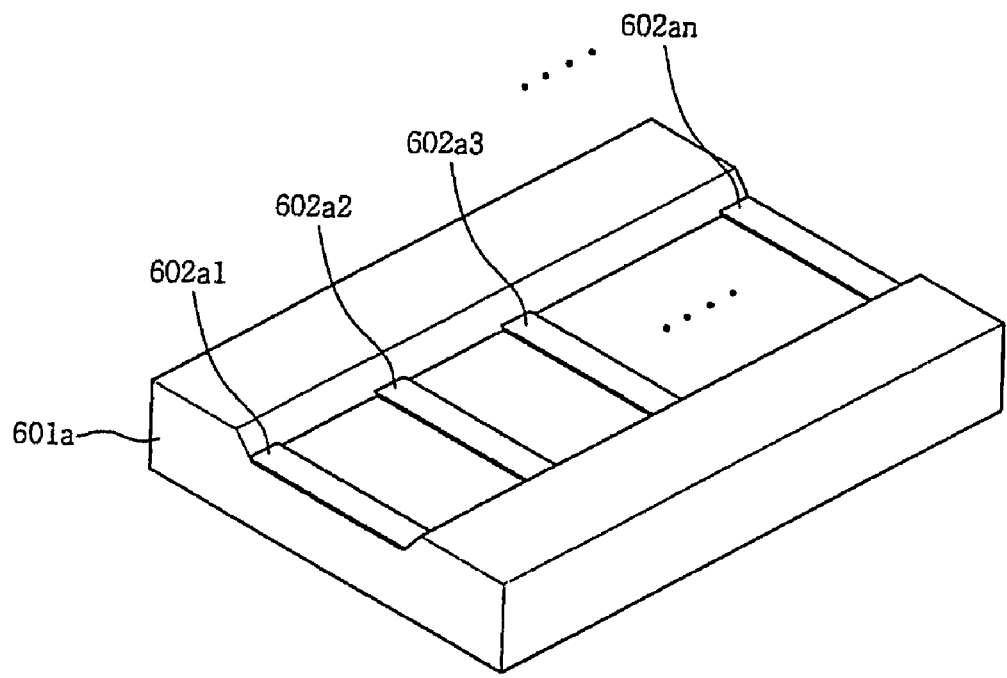

FIG. 5a is a perspective view of a transmissive-diffractive light modulator, according to a first embodiment of the present invention. FIG. 5b is an exploded perspective view of a substrate 601a of the transmissive-diffractive light modulator of FIG. 5a.

Referring to FIGS. 5a and 5b, the transmissive-diffractive light modulator according to the first embodiment of the present invention includes the substrate 601a which has a recess thereon and is made of a transparent material, such as glass. The light modulator further includes a plurality of reflective plates 602a1~602an which is provided on a bottom of the recess of the substrate 601a, and a plurality of elements 610a1~610an. At this time, the plurality of elements 610a1~610an must be spaced apart from each other at appropriate intervals to allow sufficient incident light to pass through spaces defined between the elements 610a1~610an.

The substrate 601a is made of transparent material to allow incident light to pass through the substrate 601a.

The substrate 601a has the recess to provide an air space to the plurality of elements 610a1~610an. Each element 610a1~610an is attached to the substrate 601a at both ends thereof along upper ends of sidewalls of the recess of the substrate 601a.

As shown in FIG. 5b, the plurality of reflective plates 602a1~602an are attached to the bottom of the recess of the substrate 601a to reflect incident light passing through the spaces between the elements 610a~610an.

The elements 610a~610an each have a ribbon shape. Lower sides of the both ends of the elements 610a1~610an are attached to the upper side of the substrate 601a other than the recess so that the intermediate portions of the elements 610a1~610an are spaced apart from the recess of the substrate 601a.

The construction of the element 610a1 will be described herein below. Other elements 610a2~610an have the same construction as that of the element 610a1, therefore further explanation is deemed unnecessary. The element 610a1 includes a lower supporter 611a which has a vertically movable portion corresponding in position to the recess of the substrate 601a, and a lower electrode layer 612a which is laminated on the lower supporter 611a to provide a piezoelectric voltage. The element 610a1 further includes a piezoelectric material layer 613a which is laminated on the lower electrode layer 612a and shrinks and expands to generate a vertical actuating force when voltage is applied to upper and lower surfaces thereof. The element 610a further includes an upper electrode layer 614a which is laminated on the piezoelectric material layer 613a and provides a piezoelectric voltage to the piezoelectric material layer 613a. The element 610a further includes a micromirror layer 615a which is laminated on the upper electrode layer 614a to reflect and diffract incident light. At this time, a lower surface of the lower supporter 611a comprises a reflective surface to reflect incident light. In the meantime, the element 610a1 may not include the lower supporter 611a. In this case, the lower electrode layer 612a must have the reflective surface on a lower surface thereof. Furthermore, the element 610a may not include the micromirror layer 615a. In this case, if reflection of incident light is required on an upper surface of the element 610a, an upper surface of the upper electrode layer 614a serves as an upper reflective surface.

Figure 6A:
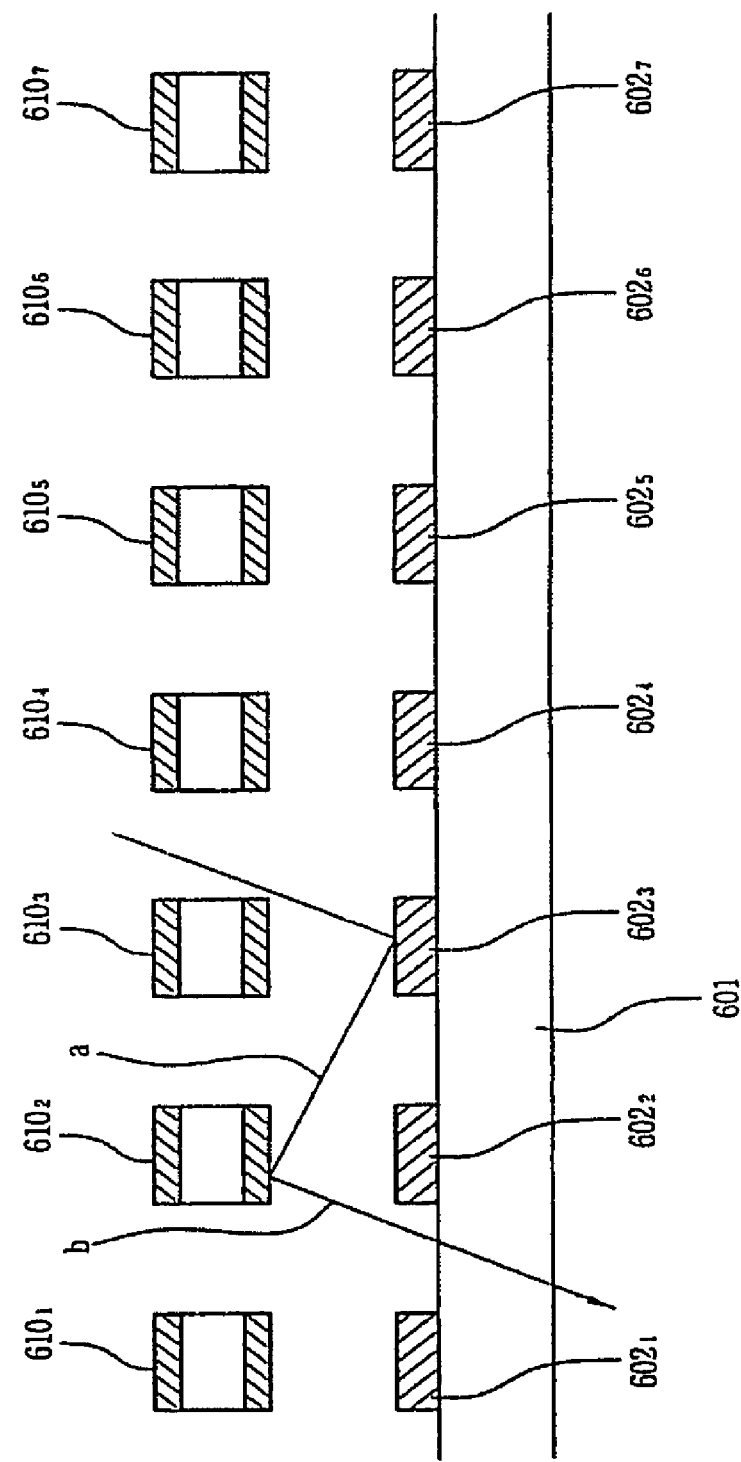
FIGS. 6a and 6b are sectional views showing a mechanism of generating diffracted light using each of the transmissive-diffractive light modulators according to first through sixth embodiments of the present invention.
Figure 6B:
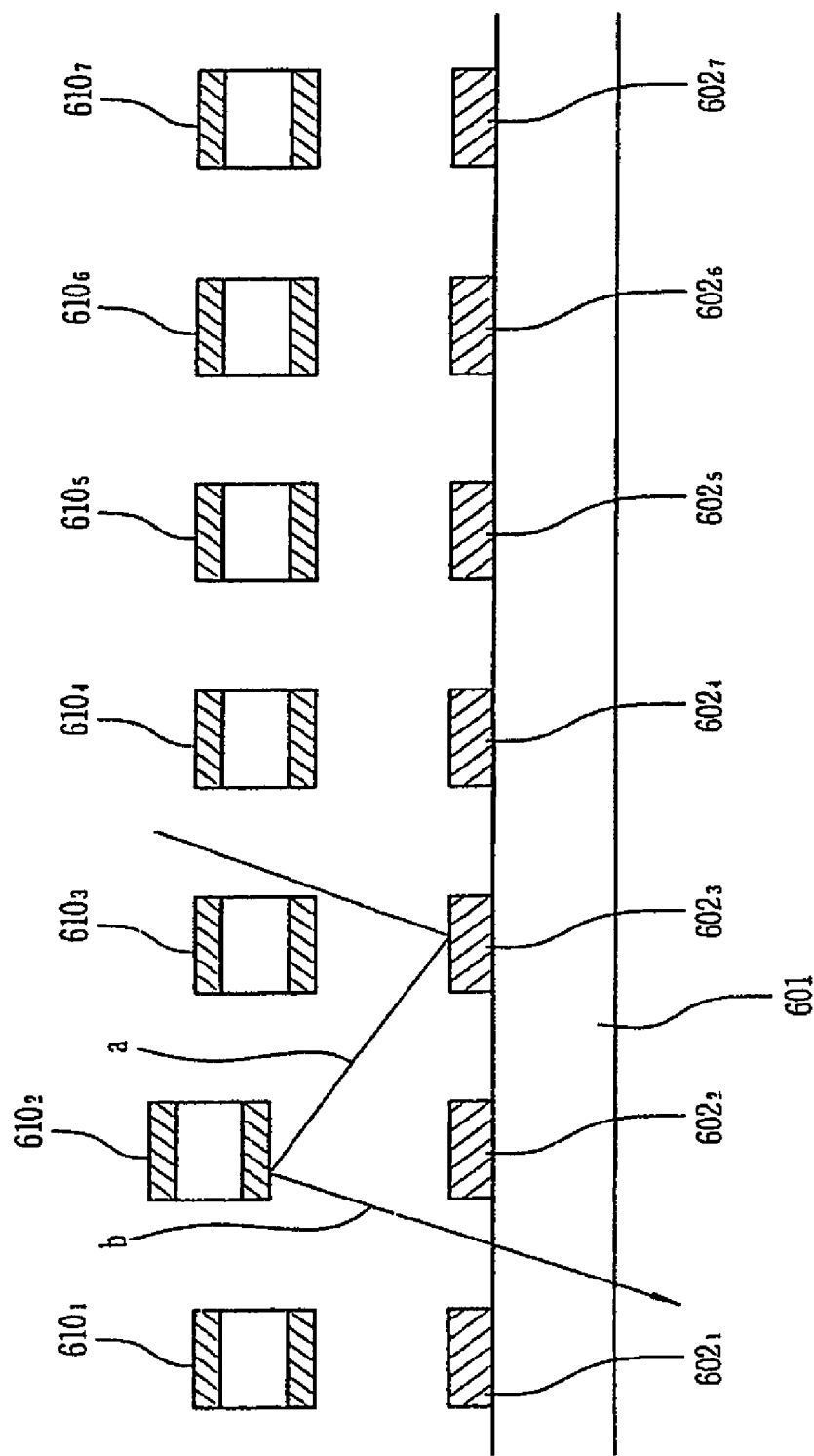

With reference to FIGS. 6a and 6b, a mechanism of generating diffractive light in the transmissive-diffractive light modulator according to the first embodiment shown in FIGS. 6a and 6b will be explained.

As shown in FIGS. 6a and 6b, incident light enters into the substrate 601 through the spaces between the elements 6101~610n. Of the incident light entering in the substrate 601, parts of the incident light, entering toward regions of the substrate 601 other than the plurality of reflective plates 6021~602n, directly pass the substrate 601 through spaces defined between the reflective plates 6021~602n. The remaining incident light, entered toward the reflective plates 6021~602n, is reflected by the reflective plates 6021~602n. Parts of the reflected light go towards the reflective surfaces formed under the lower surfaces of the elements 6101~610n. The reflective surfaces of the elements 6101~610n reflect the parts of the reflected light toward the substrate 601 again.

The light reflected by the reflective surfaces of the elements $610_1$~$610_n$ goes towards the substrate 601 again and, thereafter, is reflected by or passes through the substrate 601 in the above-mentioned operation.

At this time, as shown in FIG. 6a, a path difference between the incident light directly passing through the substrate 601, and the incident light passing through the substrate 601 after being reflected on the reflective plates 6021~602n, is caused along paths that are designated by the reference characters 'a' and 'b'. In addition, the above-mentioned path difference may be changed by a vertical movement of each of the elements 6101~610n, as shown in FIG. 6b. Therefore, when the path difference between the passing light and the reflected light is proportional to a multiple of $\lambda/4$, diffraction of light is generated. Of course, if the path difference is proportional to a multiple of $\lambda/2$, no diffraction of light is generated.

Figure 5C:
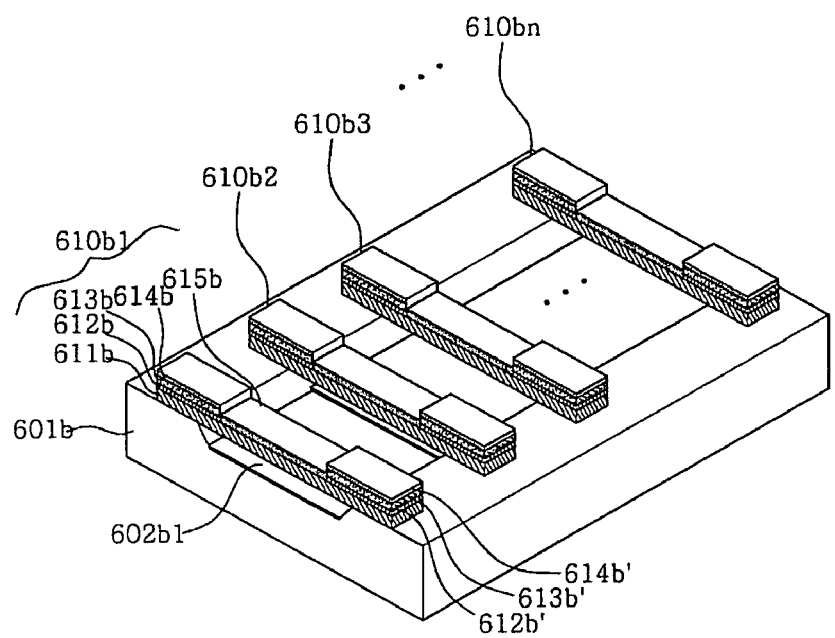
Figure 5D:
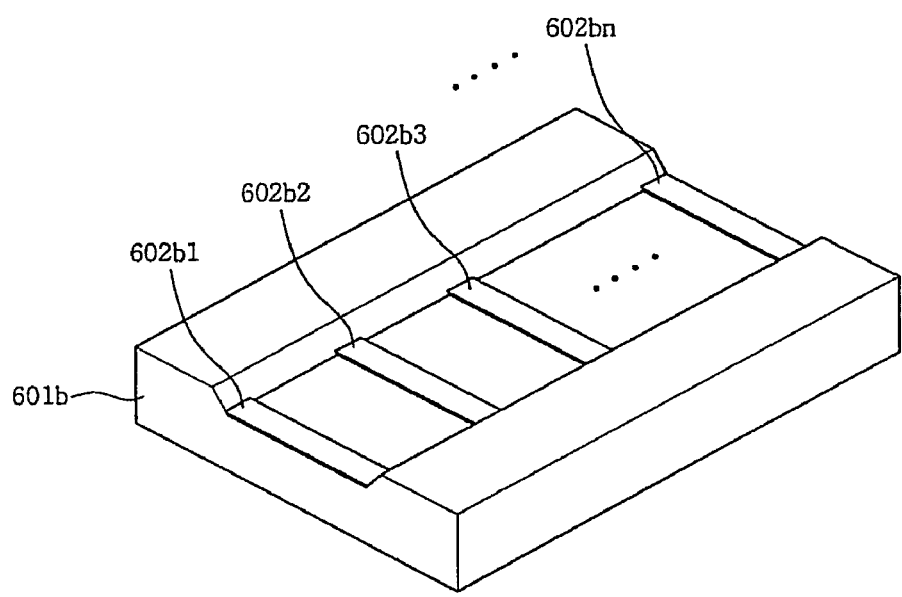

FIG. 5c is a perspective view of a transmissive-diffractive light modulator, according to a second embodiment of the present invention. FIG. 5d is an exploded perspective view of a substrate 601b of the transmissive-diffractive light modulator of FIG. 5c.

Referring to FIGS. 5c and 5d, a difference between the first and second embodiments is that piezoelectric layers of the second embodiment are provided at both ends of each of elements 610b1~610bn unlike the first embodiment.

The light modulator according to the second embodiment includes the substrate 601b which is made of a transparent material, such as glass. The light modulator further includes a plurality of reflective plates 602b1~602bn which is attached to the substrate 601b, and the plurality of elements 610b1~610bn. At this time, the plurality of elements 610b1~610bn must be spaced apart from each other at appropriate intervals to allow sufficient incident light to pass through spaces defined between the elements 610b1~610bn.

The substrate 601b is made of transparent material to allow incident light to pass through the substrate 601b.

The substrate 601b has a recess to provide an air space to the plurality of elements 610b1~610bn. Each element 610b1~610bn is attached to the substrate 601b at both ends thereof along upper ends of sidewalls of the recess of the substrate 601b.

The elements 610b1~610bn each have a ribbon shape. Lower sides of the both ends of the elements 610b1~610bn are attached to the remaining upper side of the substrate 601b other than the recess so that the intermediate portions of the elements 610b1~610bn are spaced apart from the recess of the substrate 601b. Each element 610b1~610bn includes a lower supporter 611b which has a vertically movable portion corresponding in position to the recess of the substrate 601b.

Furthermore, the element 610b1 (Although the construction of the element 610b1 will be described herein below, other elements 610b2~610bn have the same construction as that of the element 610b1) further includes a first lower electrode layer 612b which is laminated on a first end of the lower supporter 611b to provide a piezoelectric voltage. The element 610b1 further includes a first piezoelectric material layer 613b which is laminated on the first lower electrode layer 612b and shrinks and expands to generate a vertical actuating force when voltage is applied to upper and lower surfaces thereof. The element 610b1 further includes a first upper electrode layer 614b which is laminated on the first piezoelectric material layer 613b and provides a piezoelectric voltage to the first piezoelectric material layer 613b.

In addition, the element 610b1 includes a second lower electrode layer 612b' which is laminated on a second end of the lower supporter 611b to provide a piezoelectric voltage, and a second piezoelectric material layer 613b' which is laminated on the second lower electrode layer 612b' and shrinks and expands to generate a vertical actuating force when voltage is applied to upper and lower surfaces thereof. The element 610b further includes a second upper electrode layer 614b' which is laminated on the second piezoelectric material layer 613b' and provides a piezoelectric voltage to the second piezoelectric material layer 613b'.

In the light modulator according to the second embodiment having the above-mentioned construction, when the first and second piezoelectric material layers 613b and 613b', formed on the both ends of the element 610b1, shrink and expand, the intermediate portion of the element 610b1 moves vertically. A lower surface of the lower supporter 611b comprises a reflective surface to reflect or diffract incident light.

A mechanism of generating diffractive light in the transmissive-diffractive light modulator according to the second embodiment is the same as that of the first embodiment which was explained with reference to FIGS. 6a, and 6b.

Figure 5E:
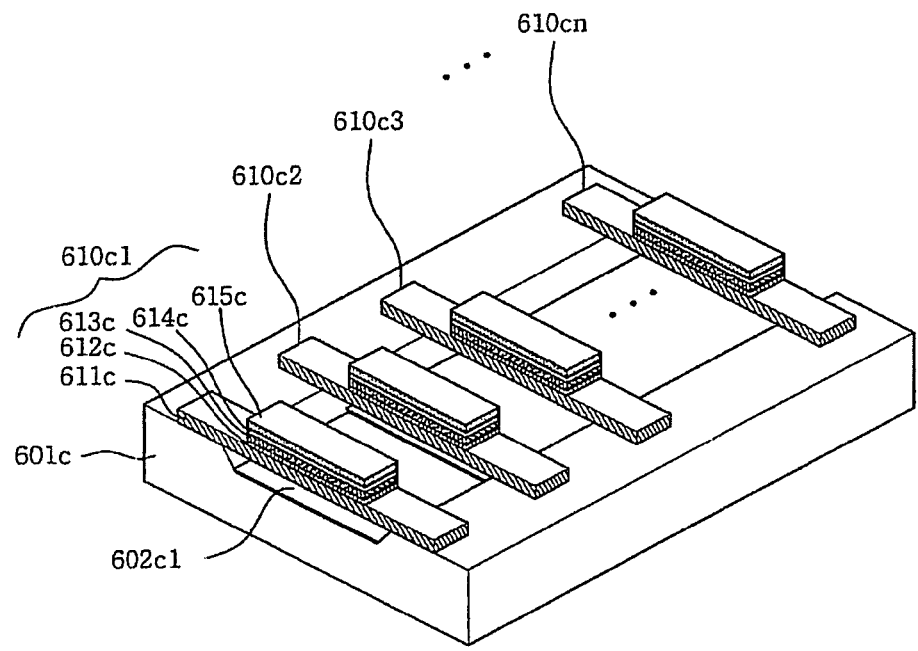
Figure 5F:
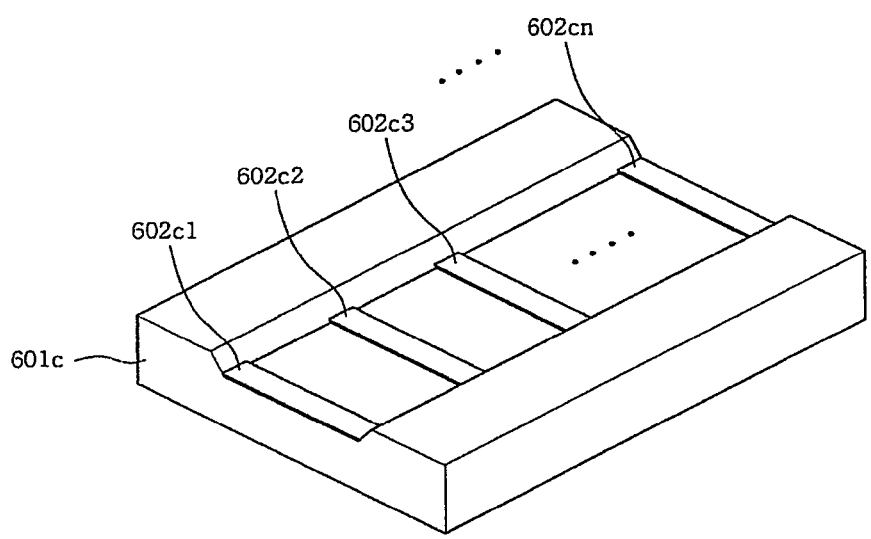

FIG. 5e is a perspective view of a transmissive-diffractive light modulator, according to a third embodiment of the present invention. FIG. 5f is an exploded perspective view of a substrate 601c of the transmissive-diffractive light modulator of FIG. 5e.

As shown in FIGS. 5e and 5f, in the transmissive-diffractive light modulator according to the third embodiment, a piezoelectric layer is provided on an intermediate portion of each of the plurality of elements 610c1~610cn, unlike the first and second embodiments.

The light modulator according to the second embodiment includes the substrate 601c which is made of a transparent material, such as glass, and the plurality of elements 610c1~610cn. At this time, the plurality of elements 610c1~610cn must be spaced apart from each other at appropriate intervals to allow sufficient incident light to pass through spaces defined between the elements 610c1~610cn.

The substrate 601c is made of transparent material to allow incident light to pass through the substrate 601c.

The substrate 601c has a recess to provide an air space to the plurality of elements 610c1~610cn. Each element 610c1~610cn is attached to the substrate 601c at both ends thereof along upper ends of sidewalls of the recess of the substrate 601c. The light modulator further includes a plurality of reflective plates 602c1~602cn which is attached to a bottom of the recess of the substrate 601c.

The elements 610c1~610cn each have a ribbon shape. Lower sides of the both ends of the elements 610c1~610cn are attached to the remaining upper side of the substrate 601c other than the recess so that the intermediate portions of the elements 610c1~610cn are spaced apart from the recess of the substrate 601c. Although the construction of the element 610c1 will be described herein below, other elements 610c2~610cn have the same constructions as that of the element 610c1. A micromirror layer 615c is formed on an upper side of the element 610c1 above the recess of the substrate 601c. That is, portions of the micromirror layer 615c, which are aligned with the remaining upper side of the substrate 601c other than the recess, are removed by an etching process. Additionally, the element 610c1 includes a lower supporter 611c which has a vertically movable portion corresponding in position to the recess of the substrate 601c.

Furthermore, the element 610c1 includes a lower electrode layer 612c which is laminated on the lower supporter 611c above the recess of the substrate 601c to provide a piezoelectric voltage. At this time, portions of the lower electrode layer 612c, which are aligned with the remaining upper side of the substrate 601c other than the recess, are removed by an etching process. The element 610c1 further includes a piezoelectric material layer 613c which is laminated on the lower electrode layer 612c and shrinks and expands to generate a vertical actuating force when voltage is applied to upper and lower surfaces thereof. The element 610c1 further includes an upper electrode layer 614c which is laminated on the piezoelectric material layer 613c and provides a piezoelectric voltage to the piezoelectric material layer 613c. The element 610c1 further includes the micromirror layer 615c which is laminated on the upper electrode layer 614c to reflect and diffract incident light. The operation of each of the elements 610c1~614cn of the third embodiment is similar to that of the first embodiment. A mechanism of generating diffractive light in the transmissive-diffractive light modulator according to the third embodiment is the same as that of the first embodiment which was explained with reference to FIGS. 6a and 6b.

Figure 5G:
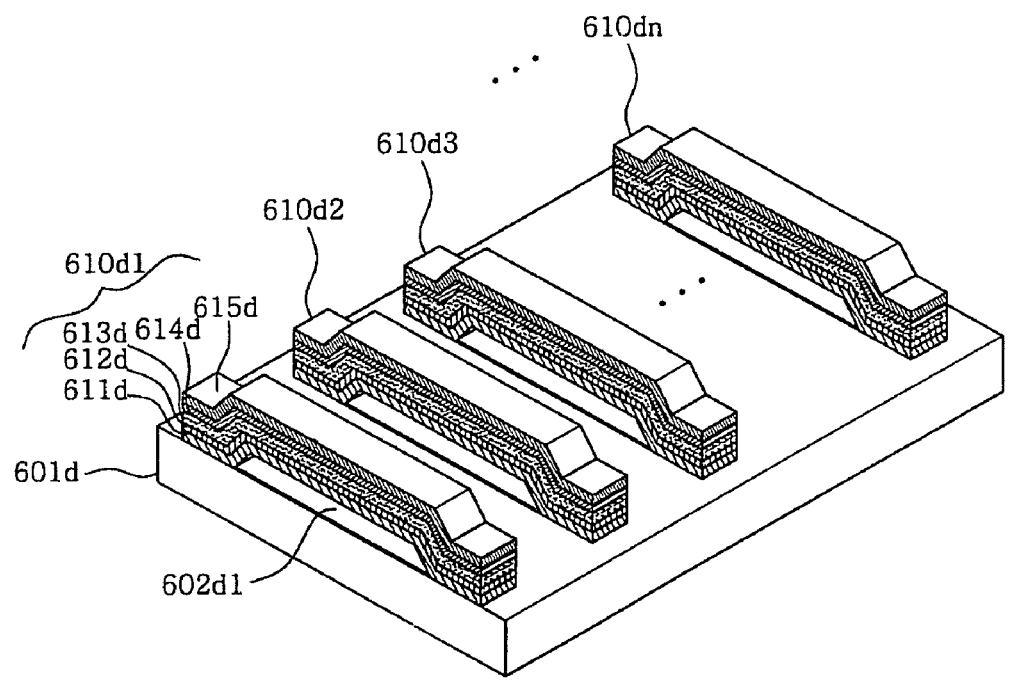
Figure 5H:
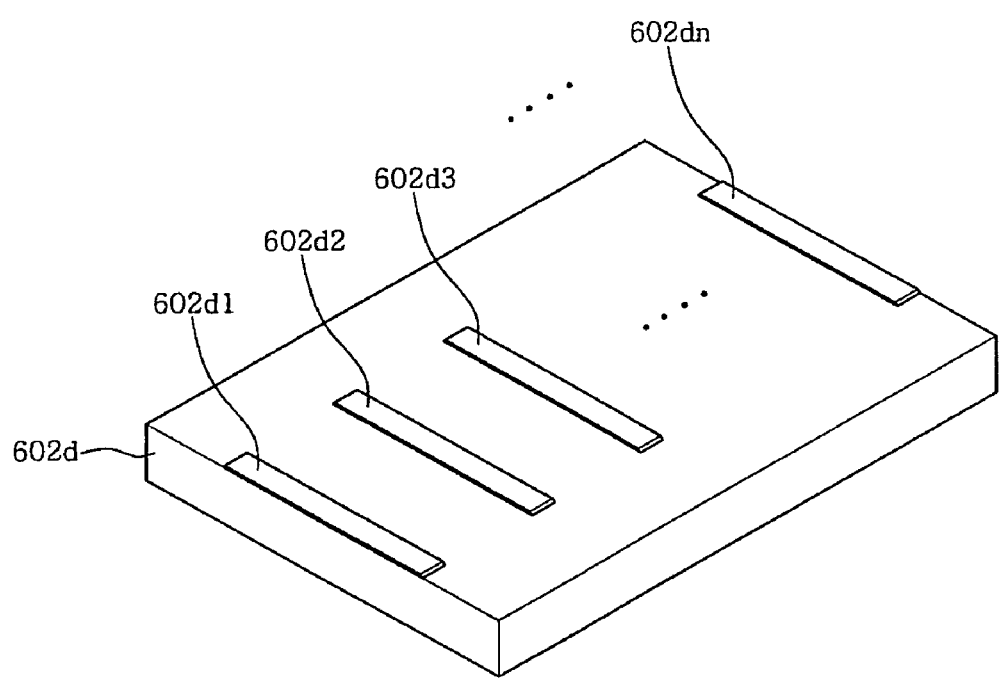

FIG. 5g is a perspective view of a transmissive-diffractive light modulator, according to a fourth embodiment of the present invention. FIG. 5h is an exploded perspective view of a substrate 601d of the transmissive-diffractive light modulator of FIG. 5g.

As shown in FIGS. 5g and 5h, in the transmissive-diffractive light modulator according to the fourth embodiment, a lower supporter 611d of each of a plurality of elements 610d1~610dn is raised on a substrate 601d at an intermediate portion thereof to form an air space, unlike the transmissive-diffractive light modulators according to the first through third embodiments. Thus, the intermediate portion of each of the lower supporters 611d is vertically movable.

Each element 610d1~610$d_n$ includes a micromirror layer 615d to reflect and diffract incident light. Each element 610d1~610dn is raised on the substrate 601d at the intermediate portion thereof, thus being vertically movable.

Each element 610d1~610dn further includes the lower supporter 611d which is attached to the substrate 601d at both ends thereof while being raised on the substrate 601d at an intermediate portion thereof to provide the air space to each of the elements 610d1~610dn.

The transmissive-diffractive light modulator according to the fourth embodiment includes the substrate 601d which is made of a transparent material, such as glass. The light modulator further includes a plurality of reflective plates 602d1~602dn which is attached to the substrate 601d; and the plurality of elements 610d1~610dn. At this time, the plurality of elements 610d1~610dn must be spaced apart from each other at appropriate intervals to allow sufficient incident light to pass through spaces defined between the elements 610d1~610dn.

The substrate 601d is made of transparent material to allow incident light to pass through the substrate 601d. Each element 610d1~610dn is attached at both ends thereof to an upper surface of the substrate 601d. The reflective plates 602d1~602dn are attached to predetermined positions of the upper surface of the substrate 601d at which the intermediate portions of the elements 610d1~610dn are spaced from the substrate 601d.

Herein, the construction of the element 610d1 is explained, but other elements 610d2~610dn have the same construction as that of the element 610d1, therefore further explanation is deemed unnecessary.

The elements 610d1 has a rod shape, and lower sides of both ends of the element 610d1 are attached to the upper surface of the substrate 601d so that the intermediate portion of the element 610d1 is spaced apart from the substrate 601d. The micromirror layer 615d is formed on an upper side of the element 610d1. Additionally, the element 610d1 includes the lower supporter 611d which has a vertically movable portion spaced apart from the substrate 601d.

Furthermore, the element 610d1 includes a lower electrode layer 612d which is laminated on the lower supporter 611d to provide a piezoelectric voltage, and a piezoelectric material layer 613d which is laminated on the lower electrode layer 612d and shrinks and expands to generate a vertical actuating force when voltage is applied to upper and lower surfaces thereof. The element 610d1 further includes an upper electrode layer 614d which is laminated on the piezoelectric material layer 613d and provides a piezoelectric voltage to the piezoelectric material layer 613d. The element 610d further includes the micromirror layer 615d which is laminated on the upper electrode layer 614d to reflect and diffract incident light.

The operation of each of the elements 610d1~610dn of the fourth embodiment is similar to that of the first embodiment. A mechanism of generating diffractive light in the transmissive-diffractive light modulator according to the fourth embodiment is the same as that of the first embodiment which was explained with reference to FIGS. 6a and 6b.

Figure 5I:
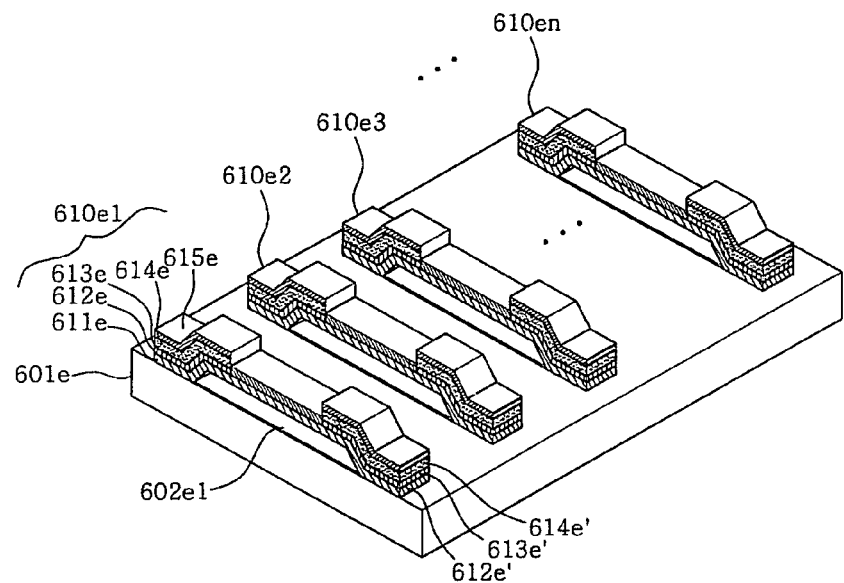
Figure 5J:
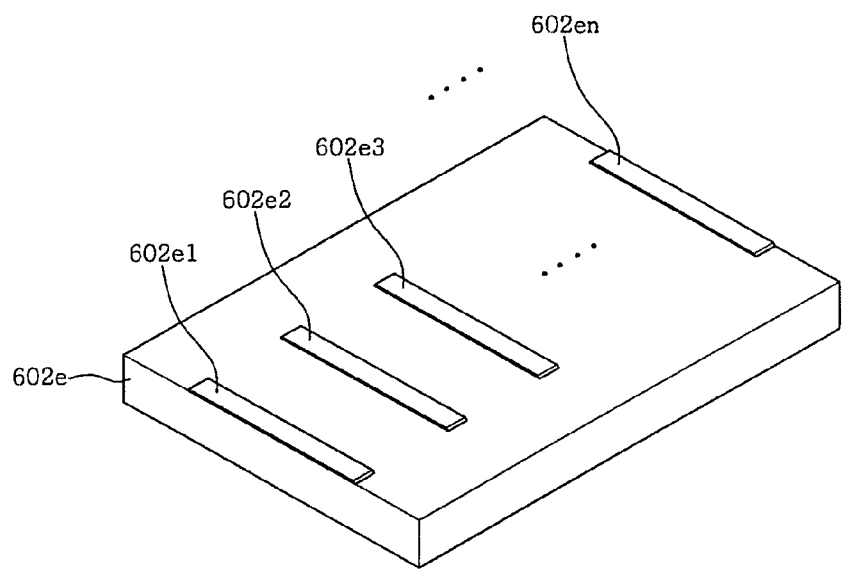

FIG. 5i is a perspective view of a transmissive-diffractive light modulator, according to a fifth embodiment of the present invention. FIG. 5j is an exploded perspective view of a substrate 601e of the transmissive-diffractive light modulator of FIG. 5i.

Referring to FIGS. 5i and 5j, in the transmissive-diffractive light modulator according to the fifth embodiment, a lower supporter 611e of each of a plurality of elements 610e1~610en is raised on a substrate 601e at an intermediate portion thereof to form an air space, unlike the transmissive-diffractive light modulators according to the first through third embodiments. Thus, the intermediate portions of the elements 610e1~610en are vertically movable. As well, piezoelectric layers of the fifth embodiment are provided at both ends of each of the elements 610e1~610en, unlike the fourth embodiment.

Each element 610e1~610en includes a pair of micromirror layers 615e to reflect and diffract incident light. Each element 610e1~610en is raised on the substrate 601e at the intermediate portion thereof, thus being vertically movable.

Each element 610e1~610en further includes the lower supporter 611e which is attached to the substrate 601e at both ends thereof while being raised on the substrate 601e at an intermediate portion thereof to provide the air space to each of the elements 610e1~610en.

The transmissive-diffractive light modulator according to the fifth embodiment includes the substrate 601e which is made of a transparent material, such as glass. The light modulator further includes a plurality of reflective plates 602e1~602en which is attached to the substrate 601e; and the plurality of elements 610e1~610en. At this time, the plurality of elements 610e1~610en must be spaced apart from each other at appropriate intervals to allow sufficient incident light to pass through spaces defined between the elements 610e1~610en.

The substrate 601e is made of transparent material to allow incident light to pass through the substrate 601e. Each element 610e1~610en is attached at both ends thereof to an upper surface of the substrate 601e.

The reflective plates 602e1~602en are attached to predetermined positions on the upper surface of the substrate 601e at which the intermediate portions of the elements 610e1~610en are spaced from the substrate 601e.

Herein, the construction of the element 610e1 is explained, but other elements 610e2~610en have the same constructions as that of the element 610e1, therefore further explanation is deemed unnecessary.

The element 610e1 has a rod shape, and lower sides of both ends of the element 610e1 are attached to the upper surface of the substrate 601e so that the intermediate portion of the element 610e1 is spaced from the substrate 601e. The micromirror layers 615e are formed on an upper side of the both ends of the element 610e1. Additionally, the element 610e1 includes the lower supporter 611e which has a vertically movable portion spaced apart from the substrate 601e.

The element 610e1 further includes a first lower electrode layer 612e which is laminated on a first end of the lower supporter 611e to provide a piezoelectric voltage. The element 610e1 further includes a first piezoelectric material layer 613e which is laminated on the first lower electrode layer 612e and shrinks and expands to generate a vertical actuating force when voltage is applied to upper and lower surfaces thereof. The element 610e1 further includes a first upper electrode layer 614e which is laminated on the first piezoelectric material layer 613e and provides a piezoelectric voltage to the first piezoelectric material layer 613e.

In addition, the element 610e1 includes a second lower electrode layer 612e' which is laminated on a second end of the lower supporter 611e to provide a piezoelectric voltage, and a second piezoelectric material layer 613e' which is laminated on the second lower electrode layer 612e' and shrinks and expands to generate a vertical actuating force when voltage is applied to upper and lower surfaces thereof. The element 610e1 further includes a second upper electrode layer 614e' which is laminated on the second piezoelectric material layer 613e' and provides a piezoelectric voltage to the second piezoelectric material layer 613e'.

The operation of each of the elements 610e1~610en of the fifth embodiment is similar to that of the first embodiment. A mechanism of generating diffractive light in the transmissive-diffractive light modulator according to the fifth embodiment is the same as that of the first embodiment which was explained with reference to FIGS. 6a and 6b.

Figure 5K:
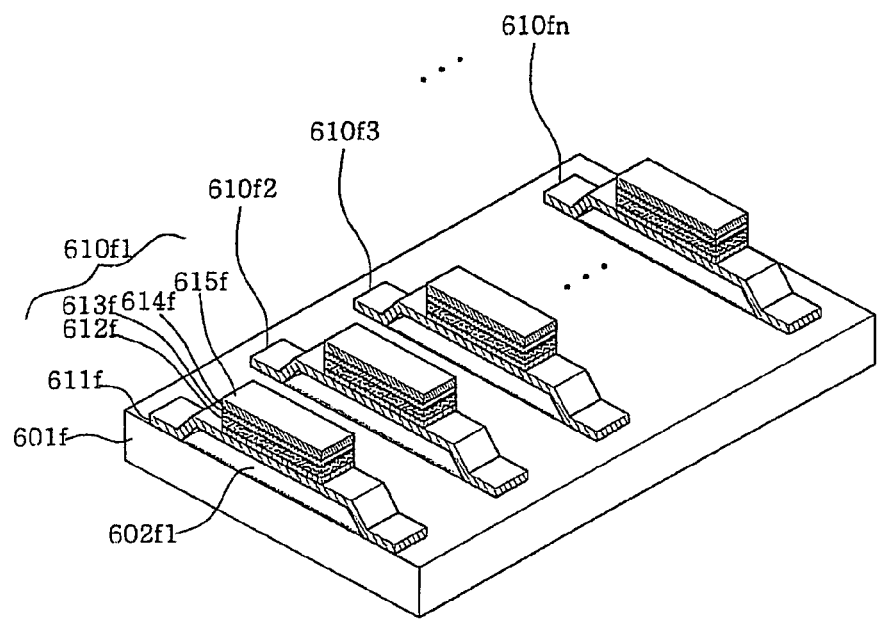
Figure 5L:
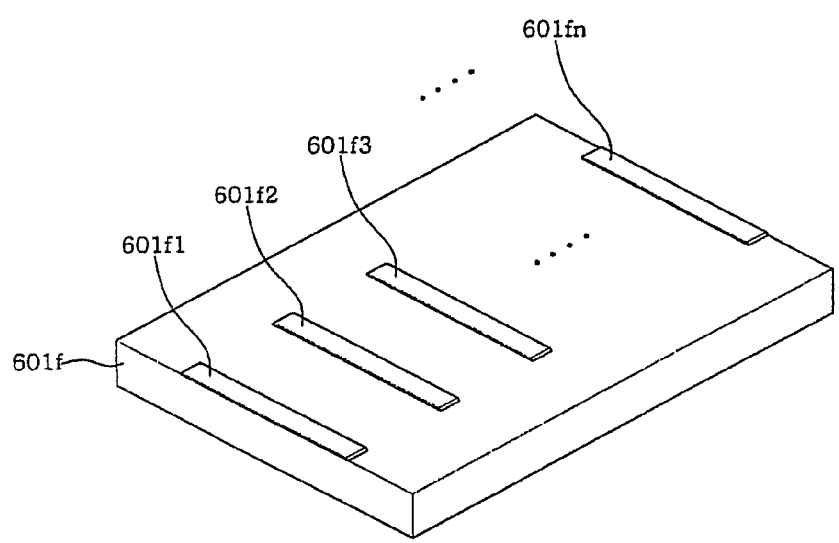

FIG. 5k is a perspective view of a transmissive-diffractive light modulator, according to a sixth embodiment of the present invention. FIG. 5l is an exploded perspective view of a substrate 601f of the transmissive-diffractive light modulator of FIG. 5k.

Referring to FIGS. 5k and 5l, in the transmissive-diffractive light modulator according to the sixth embodiment, a lower supporter 611f of each of a plurality of elements 610f1~610fn is raised on a substrate 601f at an intermediate portion thereof to form an air space, unlike the transmissive-diffractive light modulators according to the first through third embodiments. Thus, the intermediate portions of the elements 610f1~610fn are vertically movable. As well, a piezoelectric layer is provided on the intermediate portion of each of the plurality of elements 610f1~610fn, unlike the fourth and fifth embodiments.

Each element 610f1~610fn includes a micromirror layer 615f to reflect and diffract incident light. Each element 610f1~610fn is raised on the substrate 601f at the intermediate portion thereof, thus being vertically movable.

Each element 610f1~610fn further includes the lower supporter 611f which is attached to the substrate 601f at both ends thereof while being raised on the substrate 601f at an intermediate portion thereof to provide the air space to each of the elements 610f1~610fn.

The transmissive-diffractive light modulator according to the sixth embodiment includes the substrate 601f which is made of a transparent material, such as glass. The light modulator further includes a plurality of reflective plates 602f1~602fn which is attached to the substrate 601f; and the plurality of elements 610f1~610fn. At this time, the plurality of elements 610f1~610fn must be spaced apart from each other at appropriate intervals to allow sufficient incident light to pass through spaces defined between the elements 610f1~610fn.

The substrate 601f is made of transparent material to allow incident light to pass through the substrate 601f. Each element 610f1~610fn is attached at both ends thereof to an upper surface of the substrate 601f. The plurality of reflective plates 602f1~602fn is attached to predetermined positions of the upper surface of the substrate 601f.

Herein, the construction of the element 610f1 is explained, but other elements 610f2~610fn have the same construction as that of the element 610f1, therefore further explanation is deemed unnecessary.

The element 610f1 has a rod shape, and lower sides of both ends of the element 610f1 are attached to the upper surface of the substrate 601f so that the intermediate portion of the element 610f1 is spaced from the substrate 601f. The micromirror layer 615f is formed on an upper side of the element 610f1 above the intermediate portion of the lower supporter 611f. That is, portions of the micromirror layer 615f, which are aligned with the both ends of the lower supporter 611f, are removed by an etching process. Additionally, the element 610f1 includes the lower supporter 611f which has a vertically movable portion corresponding in position to the recess of the substrate 601f.

Furthermore, the element 610f1 includes a lower electrode layer 612f which is laminated on the lower supporter 611f to provide a piezoelectric voltage. At this time, portions of the lower electrode layer 612f, which are aligned with the both ends of the lower supporter 611f, are removed by an etching process. The element 610f1 further includes a piezoelectric material layer 613f which is laminated on the lower electrode layer 612f and shrinks and expands to generate a vertical actuating force when voltage is applied to upper and lower surfaces thereof. The element 610f1 further includes an upper electrode layer 614f which is laminated on the piezoelectric material layer 613f and provides a piezoelectric voltage to the piezoelectric material layer 613f. The element 610f1 further includes the micromirror layer 615f which is laminated on the upper electrode layer 614f to reflect and diffract incident light.

The operation of each of the elements 610f1~610fn of the sixth embodiment having the above-mentioned construction is similar to that of the third embodiment. A mechanism of generating diffractive light in the transmissive-diffractive light modulator according to the sixth embodiment is the same as that of the first embodiment which was explained with reference to FIGS. 6a and 6b.

Figure 7A:
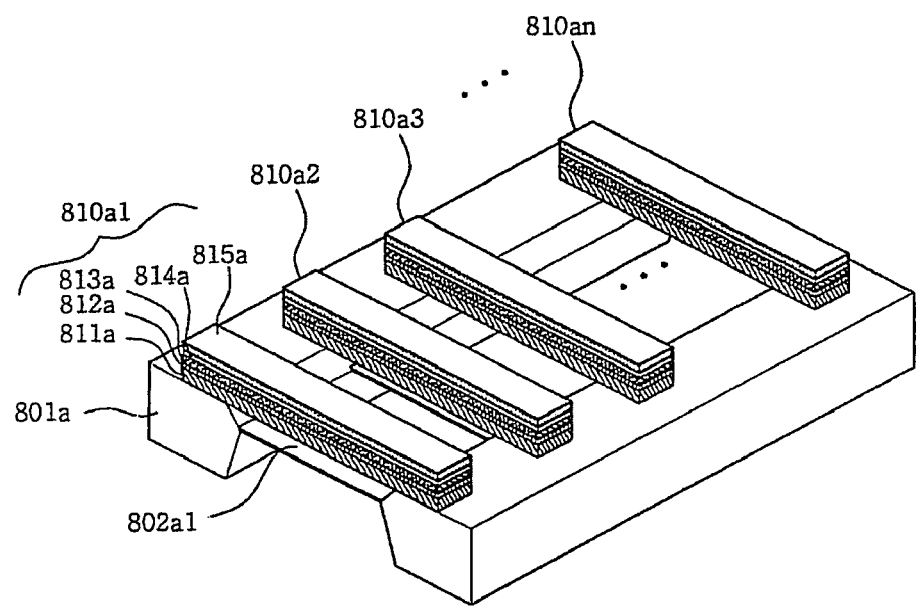
FIGS. 7a through 7f are perspective views of transmissive-diffractive light modulators or are exploded perspective views of substrates of the transmissive-diffractive light modulators, according to seventh through ninth embodiments of the present invention.
Figure 7B:
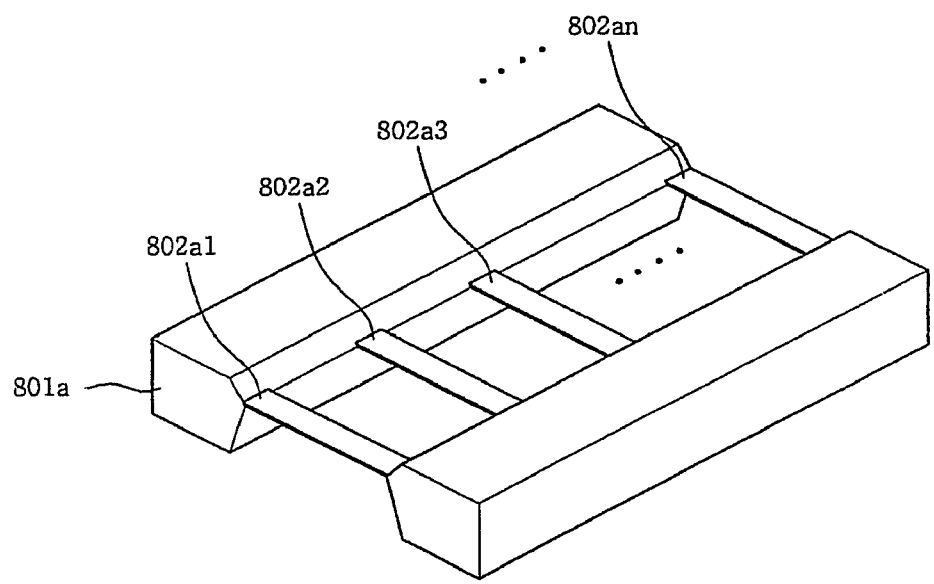

FIG. 7a is a perspective view of a transmissive-diffractive light modulator, according to a seventh embodiment of the present invention. FIG. 7b is an exploded perspective view of a substrate 801a of the transmissive-diffractive light modulator of FIG. 7a.

As shown in FIGS. 7a and 7b, the transmissive-diffractive light modulator according to the seventh embodiment includes the substrate 801a having a light transmittance gate therein; a plurality of reflective plates 802a1~802an; and a plurality of elements 810a1~810an. At this time, the plurality of elements 810a1~810an must be spaced apart from each other at appropriate intervals to allow sufficient incident light to pass through spaces defined between the elements 810a1~810an.

The substrate 801a has the light transmittance gate to allow incident light to pass through the substrate 801a.

The light transmittance gate of the substrate 801a provides an air space to the plurality of elements 810a1~810an. Each element 810a1~810an is attached to the substrate 801a at both ends thereof along upper ends of sidewalls of the light transmittance gate.

Each reflective plate 802a1~802an is attached at a predetermined depth of the light transmittance gate to the sidewalls of the light transmittance gate at both ends thereof. Each reflective plate 802a1~802an is spaced from a lower surface of each element 810a1~810an by a predetermined distance.

The construction of the element 810a1 will be explained. Other elements 810a2~810an have the same construction as that of the element 810a1, therefore further explanation is deemed unnecessary.

The element 810a1 has a rod shape, and lower sides of both ends of the element 810a1 are attached to the remaining upper side of the substrate 801a except for the light transmittance gate so that an intermediate portion of the element 810a1 is aligned with the light transmittance gate. The element 810a1 includes a micromirror layer 815a which is formed on an upper side of the element 810a1. Additionally, the element 810a1 includes a lower supporter 811a which has a vertically movable portion corresponding in position to the light transmittance gate of the substrate 801a.

The element 810a1 includes a lower electrode layer 812a which is laminated on the lower supporter 811a to provide a piezoelectric voltage. The element 810a1 further includes a piezoelectric material layer 813a which is laminated on the lower electrode layer 812a and shrinks and expands to generate a vertical actuating force when voltage is applied to upper and lower surfaces thereof. The element 810a further includes an upper electrode layer 814a which is laminated on the piezoelectric material layer 813a and provides a piezoelectric voltage to the piezoelectric material layer 813a. The element 810a further includes the micromirror layer 815a which is laminated on the upper electrode layer 814a to reflect and diffract incident light.

Figure 8A:
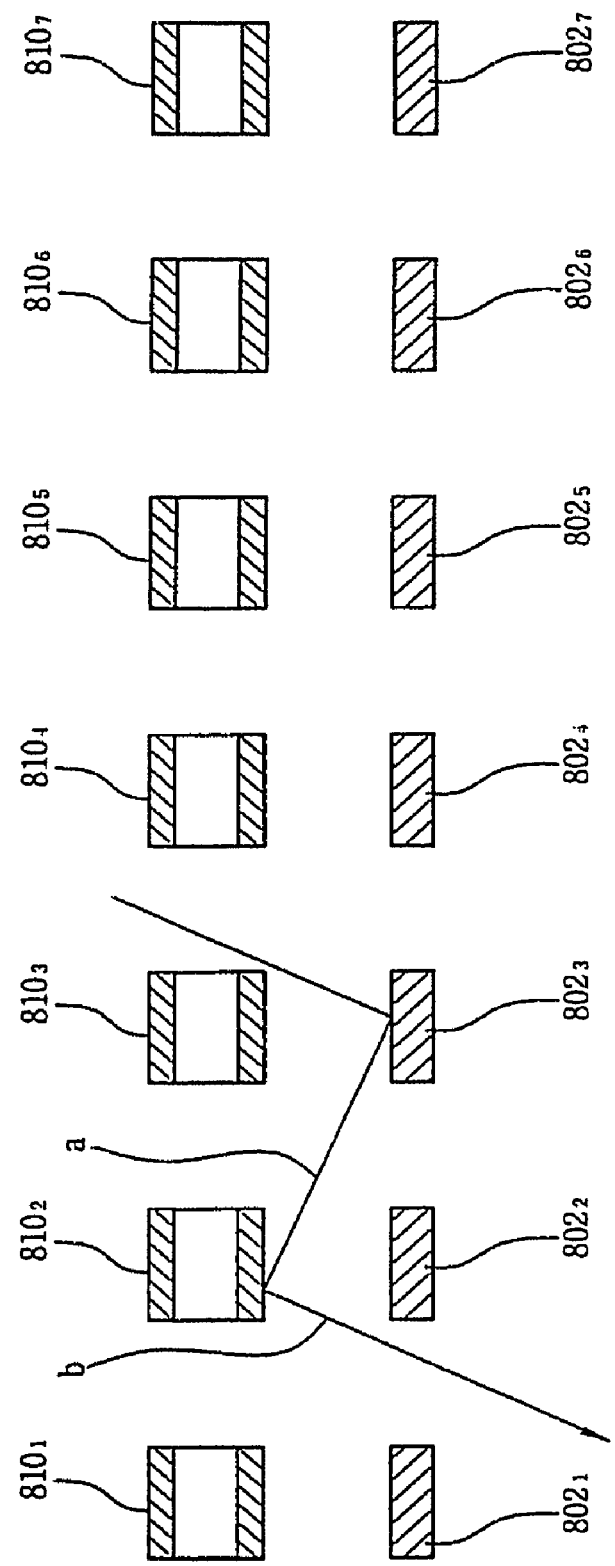
FIGS. 8a and 8b are sectional views showing the generation of diffracted light using each of the transmissive-diffractive light modulators according to first through sixth embodiments of the present invention.
Figure 8B:
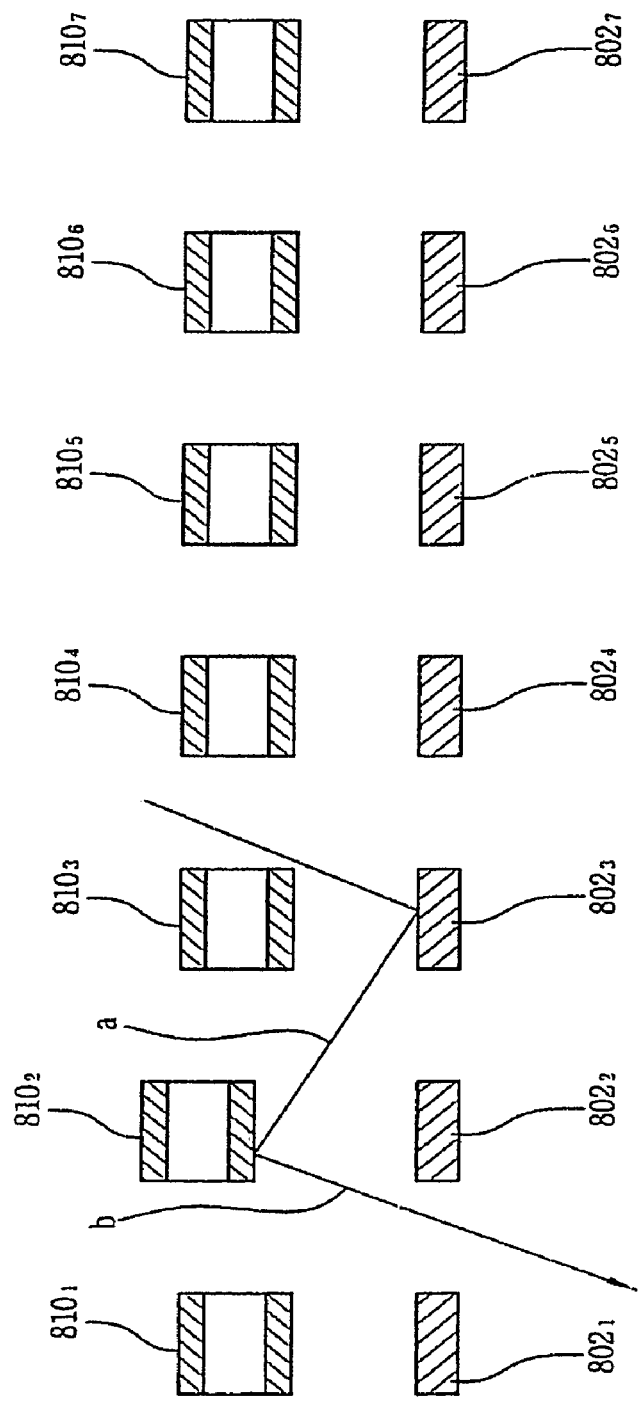

With reference to FIGS. 8a and 8b, a mechanism of generating diffractive light in the transmissive-diffractive light modulator according to the seventh embodiment shown in FIGS. 7a and 7b will be explained.

As shown in FIGS. 8a and 8b, incident light, entering into the substrate 801 through the spaces between the elements $810_1$~$810_n$, passes through the light transmittance gate of the substrate 801.

Of the incident light entering into the substrate 801, parts of the incident light, entering toward regions of the substrate 801 but not from the plurality of reflective plates $802_1$~$802_n$, directly pass the substrate 801 through spaces defined between the reflective plates $802_1$~$802_n$. The remaining incident light, entering toward the reflective plates $802_1$~$802_n$, is reflected by the reflective plates $802_1$~$802_n$. Parts of the reflected light go towards reflective surfaces formed under the lower surfaces of the elements $810_1$~$810_n$. The reflective surfaces of the elements $810_1$~$810_n$ reflect the parts of the reflected light toward the light transmittance hole again.

The reflected light by the reflective surfaces of the elements $810_1$~$810_n$ goes towards the light transmittance hole again and, thereafter, is reflected by or passes through the light transmittance hole of the substrate 801 in the above-mentioned manner.

At this time, as shown in FIG. 8a, a path difference between the incident light, directly passing through the substrate 801, and the incident light, passing through the substrate 801 after being reflected by each reflective plate $802_1$~$802_n$, is caused along paths that are designated by the reference characters 'a' and 'b'. In addition, the above-mentioned path difference may be changed by a vertical movement of each of the elements $810_1$~$810_n$, as shown in FIG. 8b. Therefore, when the path difference between the passing light and the reflected light is proportional to a multiple of $\lambda/4$, diffraction of light occurs. Of course, if the path difference is proportional to a multiple of $\lambda/2$, no diffraction of light occurs.

Figure 7C:
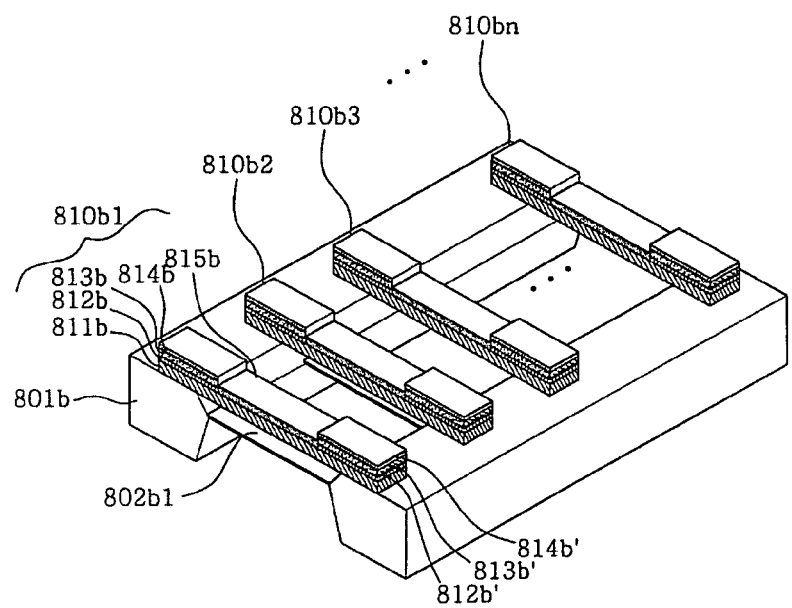
Figure 7D:
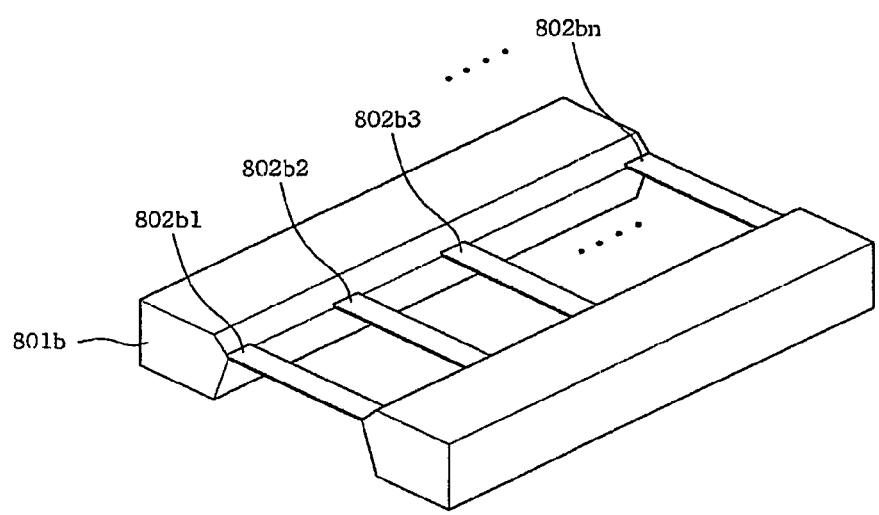

FIG. 7c is a perspective view of a transmissive-diffractive light modulator, according to an eighth embodiment of the present invention. FIG. 7d is an exploded perspective view of a substrate 801b of the transmissive-diffractive light modulator of FIG. 7c.

Referring to FIGS. 7c and 7d, a difference between the seventh and eighth embodiments is that piezoelectric layers of the eighth embodiment are provided at both ends of each of the elements 810b1~810bn unlike the seventh embodiment.

The light modulator according to the eighth embodiment includes the substrate 801b which has a light transmittance gate therein; a plurality of reflective plates 802b1~802bn; and the plurality of elements 810b1~810bn. At this time, the plurality of elements 810b1~810bn must be spaced apart from each other at appropriate intervals to allow sufficient incident light to pass through spaces defined between the elements 810b1~810bn.

The substrate 801b has the light transmittance gate to allow incident light to pass through the substrate 801b. The light transmittance gate of the substrate 801b provides an air space to the plurality of elements 810b1~810bn. Each element 810b1~810bn is attached to the substrate 801b at both ends thereof along upper ends of sidewalls of the light transmittance gate.

Each reflective plate 802b1~802bn is attached at a predetermined depth of the light transmittance gate to the sidewalls of the light transmittance gate at both ends thereof. Each reflective plate 802b1~802bn is spaced apart from a lower surface of each element 810b1~810bn by a predetermined distance.

The construction of the element 810b1 will be explained. Other elements 810b2~810bn have the same construction as that of the element 810b1, therefore further explanation is deemed unnecessary.

The element 810b1 has a rod shape. Lower sides of both ends of the element 810b1 are attached to the remaining upper side of the substrate 801b except for the light transmittance gate so that an intermediate portion of the element 810b1 is aligned with the light transmittance gate. Additionally, the element 810b1 includes a lower supporter 811b which has a vertically movable portion corresponding in position to the light transmittance gate of the substrate 801b.

Furthermore, the element 810b1 further includes a first lower electrode layer 812b which is laminated on a first end of the lower supporter 811b to provide a piezoelectric voltage. The element 810b1 further includes a first piezoelectric material layer 813b which is laminated on the first lower electrode layer 812b and shrinks and expands to generate a vertical actuating force when voltage is applied to upper and lower surfaces thereof. The element 810b1 further includes a first upper electrode layer 814b which is laminated on the first piezoelectric material layer 813b and provides a piezoelectric voltage to the first piezoelectric material layer 813b.

In addition, the element 810b1 includes a second lower electrode layer 812b' which is laminated on a second end of the lower supporter 811b to provide a piezoelectric voltage, and a second piezoelectric material layer 813b' which is laminated on the second lower electrode layer 812b' and shrinks and expands to generate a vertical actuating force when voltage is applied to upper and lower surfaces thereof. The element 810b further includes a second upper electrode layer 814b' which is laminated on the second piezoelectric material layer 813b' and provides a piezoelectric voltage to the second piezoelectric material layer 813b'.

In the light modulator according to the eighth embodiment having the above-mentioned construction, when the first and second piezoelectric material layers 813b and 813b', formed on the both ends of the element 810b1, shrink and expand, the intermediate portion of the element 810b1 moves vertically. The lower surface of the lower supporter 811b comprises a reflective surface to reflect or diffract incident light.

A mechanism of generating diffractive light in the transmissive-diffractive light modulator according to the eighth embodiment is the same as that of the seventh embodiment which was explained with reference to FIGS. 8a and 8b.

Figure 7E:
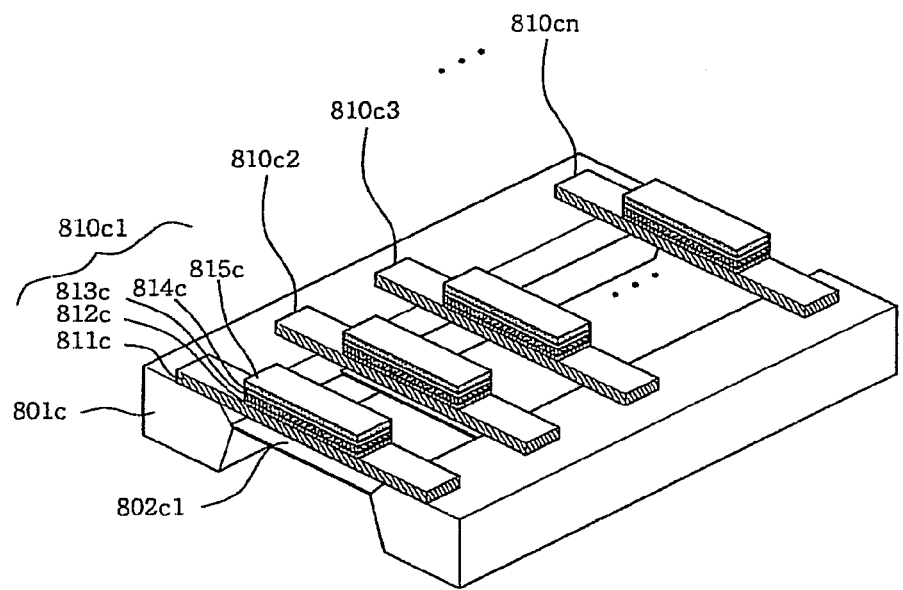
Figure 7F:
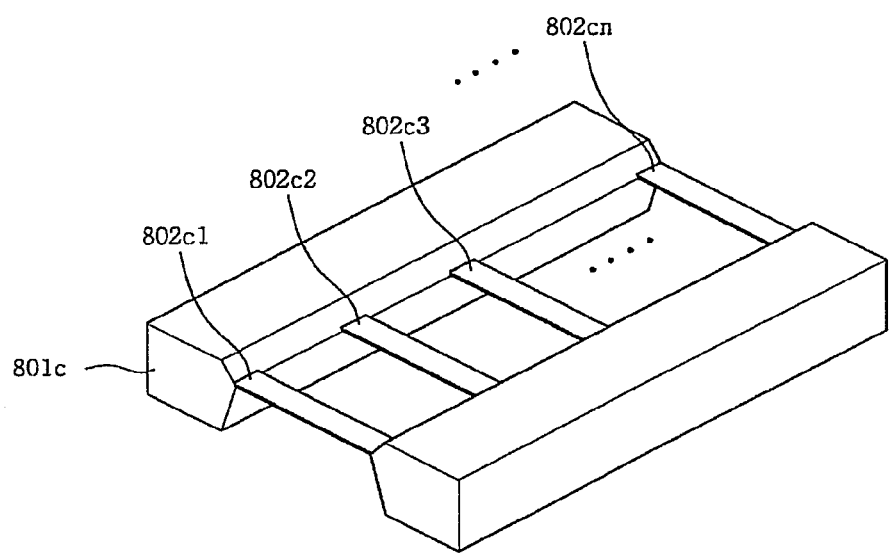

FIG. 7e is a perspective view of a transmissive-diffractive light modulator, according to a ninth embodiment of the present invention. FIG. 7f is an exploded perspective view of a substrate 801c of the transmissive-diffractive light modulator of FIG. 7e.

As shown in FIGS. 7e and 7f, in the transmissive-diffractive light modulator according to the ninth embodiment, a piezoelectric layer is provided on an intermediate portion of each of the plurality of elements 810c1~810cn, unlike the seventh and eighth embodiments.

The light modulator according to the ninth embodiment includes the substrate 801c which has a light transmittance gate therein; a plurality of reflective plates 802c1~802cn; and the plurality of elements 810c1~810cn. At this time, the plurality of elements 810c1~810cn must be spaced apart from each other at appropriate intervals to allow sufficient incident light to pass through spaces defined between the elements 810c1~810cn.

Due to the above-mentioned structure, incident light enters into the substrate 801c through the spaces between the elements 810c1~810cn. Parts of the incident light entering into the substrate 801c directly pass the substrate 801c through the light transmittance gate. The remaining incident light is reflected and diffracted by the reflective plates 802c1~802cn.

The substrate 801c has a light transmittance gate to allow incident light to pass through the substrate 801c.

The light transmittance gate of the substrate 801c provides an air space to the plurality of elements 810c1~810cn.

The construction of the element 810c1 will be explained. Other elements 810c2~810cn have the same construction as that of the element 810c1, therefore further explanation is deemed unnecessary.

The element 810c1 has a rod shape. Lower sides of the both ends of the element 810c1 are attached to the remaining upper side of the substrate 601c except for the light transmittance gate so that an intermediate portion of the element 810c1 is aligned with the light transmittance gate of the substrate 801c. The element 810c1 includes a micromirror layer 815c which is formed on an upper side of the element 810c1 above the light transmittance gate of the substrate 801c. That is, portions of the micromirror layer 815c, which are aligned with the remaining upper side of the substrate 801c other than the light transmittance gate, are removed by an etching process. Additionally, the element 810c1 further includes a lower supporter 811c which has a vertically movable portion corresponding in position to the light transmittance gate of the substrate 801c.

Furthermore, the element 810c1 includes a lower electrode layer 812c which is laminated on the lower supporter 811c above the light transmittance gate of the substrate 801c to provide a piezoelectric voltage. At this time, portions of the lower electrode layer 812c, which are aligned with the remaining upper side of the substrate 801c other than the light transmittance gate, are removed by an etching process. The element 810c1 further includes a piezoelectric material layer 813c which is laminated on the lower electrode layer 812c and shrinks and expands to generate a vertical actuating force when voltage is applied to upper and lower surfaces thereof. The element 810c1 further includes an upper electrode layer 814c which is laminated on the piezoelectric material layer 813c and provides a piezoelectric voltage to the piezoelectric material layer 813c. The element 810c1 further includes the micromirror layer 815c which is laminated on the upper electrode layer 814c to reflect and diffract incident light.

The operation of the element 810c1 of the ninth embodiment is similar to that of the seventh embodiment. A mechanism of generating diffractive light in the transmissive-diffractive light modulator in the ninth embodiment is the same as that of the seventh embodiment, which was explained with reference to FIGS. 8a and 8b.

In the meantime, the recess-type diffractive light modulator, in which the substrate has the light transmittance gate therein, was explained in detail in each of the seventh through ninth embodiments, but a raised-type diffractive light modulator having a light transmittance gate was omitted. However, the light transmittance gate can be easily adapted to the raised-type diffractive light modulator. Furthermore, the thin-film piezoelectric diffractive light modulator was explained herein. However, an electrostatic force or an electromagnetic force may be used as the actuating unit of the element. In addition, in the embodiments, the light modulator having a single piezoelectric material layer was described, but the light modulator may include multi-layered piezoelectric material layers.

As described above, the present invention provides a transmissive-diffractive light modulator which may be manufactured using a conventional diffractive light modulator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A transmissive-diffractive light modulator, comprising:
    a substrate made of a transparent material;
    a plurality of upper reflective plates being arranged on the substrate to be spaced apart from each other at predetermined intervals and each having a ribbon shape, each of the upper reflective plates being attached at both ends thereof to the substrate while being spaced at an intermediate portion thereof from the substrate and being vertically movable at the intermediate portion thereof, with a reflective lower surface provided on each of the upper reflective plates to reflect or diffract incident light;
    a plurality of lower reflective plates attached to predetermined positions of the substrate at which the plurality of upper reflective plates are spaced from the substrate, so as to reflect or diffract the incident light, the plurality of lower reflective plates being spaced apart from each other at predetermined intervals; and
    an actuating unit to move the plurality of upper reflective plates vertically.

2. The transmissive-diffractive light modulator according to claim 1, wherein the substrate has a recess thereon to provide an air space to the plurality of upper reflective plates, so that the upper reflective plates are spaced from a bottom of the recess by predetermined distances to move vertically.

3. The transmissive-diffractive light modulator according to claim 1, wherein the substrate has a planar upper surface, and each of the upper reflective plates is raised at an intermediate portion thereof to be spaced from the substrate by a predetermined distance, thus obtaining a space for vertical movement.

4. The transmissive-diffractive light modulator according to claim 1, wherein the actuating unit comprises:
    a lower electrode provided by each of the upper reflective plates;
    a piezoelectric material layer laminated on each of the upper reflective plates to generate a vertical actuating force when voltage is applied to both sides of the piezoelectric material layer; and
    an upper electrode laminated on each of the piezoelectric materials.

5. The transmissive-diffractive light modulator according to claim 1, wherein the actuating unit comprises:
    a first electrode provided by each of the upper reflective plates;
    a plurality of piezoelectric material layers laminated on each of the upper reflective plates to generate a vertical actuating force when voltage is applied to both sides of each of the piezoelectric material layers;
    a second electrode formed between neighboring piezoelectric materials to provide voltage to the associated piezoelectric materials; and
    a third electrode laminated on an uppermost piezoelectric material layer.

6. The transmissive-diffractive light modulator according to claim 1, wherein the actuating unit comprises:
- a lower electrode provided by each of the lower reflective plates; and
- an upper electrode provided by each of the upper reflective plates, so that, when voltage is applied to the upper and lower reflective plates, the upper reflective plate is moved vertically by an electrostatic force.

7. A transmissive-diffractive light modulator, comprising:
- a substrate having a light transmittance gate therein;
- a plurality of upper reflective plates being arranged on the substrate to be spaced apart from each other at predetermined intervals and each having a ribbon shape, each of the upper reflective plates being attached at both ends thereof to the substrate while passing over the light transmittance gate and being vertically movable at the intermediate portion thereof, with a reflective lower surface provided on each of the upper reflective plates to reflect or diffract incident light;
- a plurality of lower reflective plates attached at both ends thereof to sidewalls of the light transmittance gate of the substrate while being spaced apart from the plurality of upper reflective plates by predetermined distances, the plurality of lower reflective plates being arranged in the same direction as an arrangement direction of the upper reflective plates, thus reflecting or diffracting incident light; and
- an actuating unit to vertically move the plurality of upper reflective plates.

8. The transmissive-diffractive light modulator according to claim 7, wherein the substrate has a planar upper surface, and each of the upper reflective plates is raised at an intermediate portion thereof to be spaced from the substrate by a predetermined distance, thus obtaining a space for vertical movement.

9. The transmissive-diffractive light modulator according to claim 7, wherein the actuating unit comprises:
- a lower electrode provided by each of the upper reflective plates;
- a piezoelectric material layer laminated on each of the upper reflective plates to generate a vertical actuating force when voltage is applied to both sides of the piezoelectric material layer; and
- an upper electrode laminated on each of the piezoelectric materials.

10. The transmissive-diffractive light modulator according to claim 7, wherein the actuating unit comprises:
- a first electrode provided by each of the upper reflective plates;
- a plurality of piezoelectric material layers laminated on each of the upper reflective plates to generate a vertical actuating force when voltage is applied to both sides of each of the piezoelectric material layers;
- a second electrode formed between neighboring piezoelectric materials to provide the voltage to the associated piezoelectric materials; and
- a third electrode laminated on an uppermost piezoelectric material layer.

* * * * *

UNITED STATES PATENT AND TRADEMARK OFFICE
CERTIFICATE OF CORRECTION

PATENT NO. : 7,149,028 B2
APPLICATION NO. : 10/951543
DATED : December 12, 2006
INVENTOR(S) : S. K. Yun Page 1 of 1

It is certified that error appears in the above-identified patent and that said Letters Patent is hereby corrected as shown below:

| COLUMN | LINE | ERROR |
|---|---|---|
| 8 | 54 | "$610d1\sim610_{dn}$" should read --$610d1\sim610dn$-- |
| 13 | 5 | "$8101\sim810n$," should read --$810_1\sim810_n$,-- |
| 13 | 28 | "$8021\sim802n$," should read --$802_1\sim802_n$,-- |
| 13 | 31 | "$8101\sim810n$," should read --$810_1\sim810_n$,-- |

Signed and Sealed this

Twenty-fifth Day of March, 2008

JON W. DUDAS
*Director of the United States Patent and Trademark Office*